Feb. 15, 1949.  G. COZZO  2,461,630
PLASTIC MATERIAL EXTRUSION HEAD
Filed Aug. 8, 1945  2 Sheets-Sheet 1

INVENTOR.
GIUSEPPE COZZO
BY
Hammond & Littell
ATTORNEYS

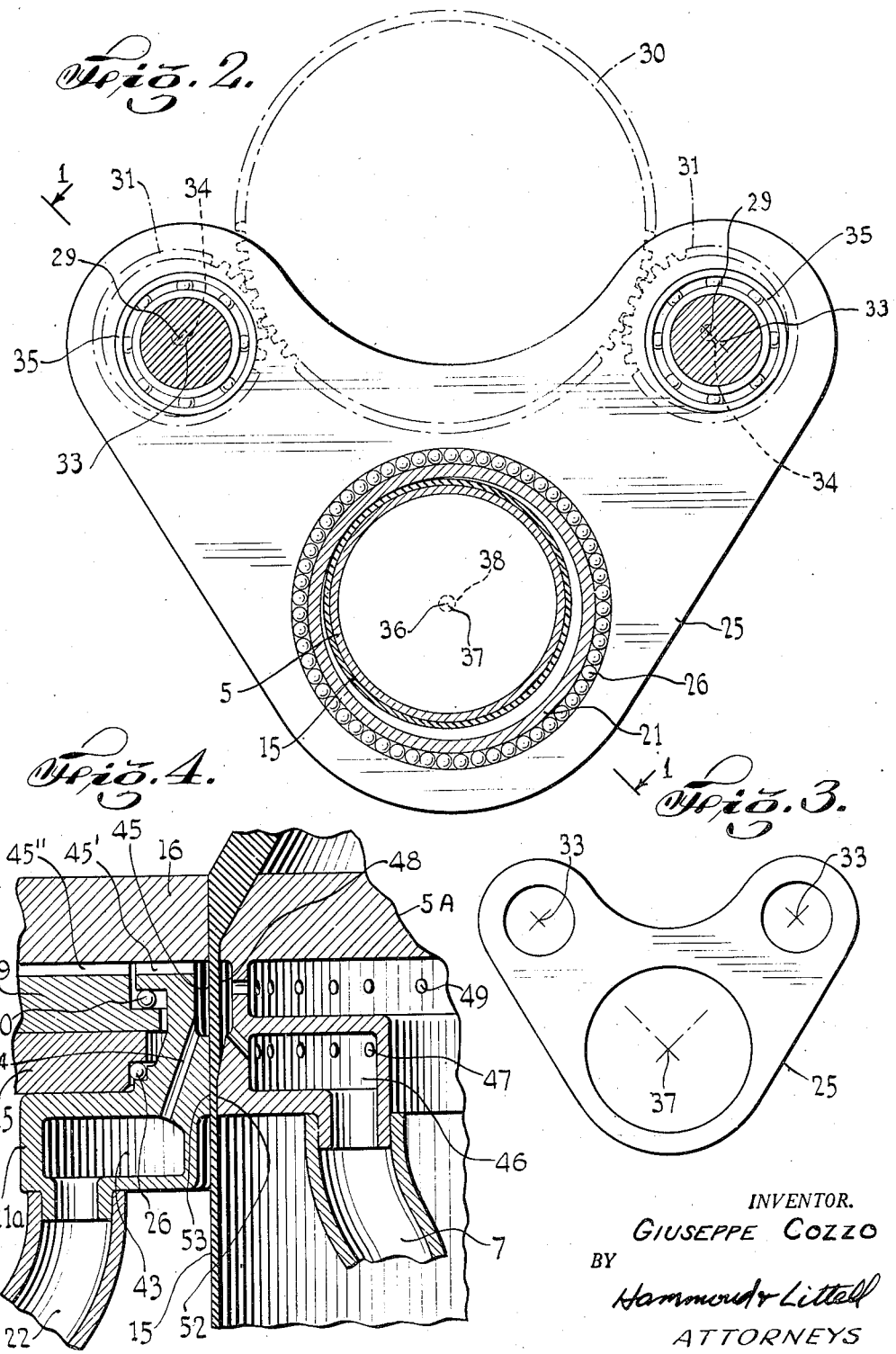

Patented Feb. 15, 1949

2,461,630

UNITED STATES PATENT OFFICE 2,461,630

PLASTIC MATERIAL EXTRUSION HEAD

Giuseppe Cozzo, New York, N. Y., assignor to Hydropress, Incorporated, New York, N. Y., a corporation of Delaware Application August 8, 1945, Serial No. 609,641

3 Claims. (Cl. 18—14)

The invention relates to a method and apparatus for extruding plastic materials, and more particularly to a sizing head for the extrusion of tubular plastic articles.

The principal object of the invention is to provide a machine and process of this type which produces plastic tubing of accurate diameter and wall thickness.

Another object of the invention is to produce a machine and method of this character which produces a tube having homogeneous walls of substantial strength.

A further object of the invention is to produce a machine and process of this type which imparts special characteristics to the plastic material during the extrusion operation.

Still another object of the invention is to produce a tube in which the plastic material of the wall is kneaded and rolled during the extrusion so as to impart to it special desirable properties. More specifically, the invention contemplates the extrusion of the material between two circular die members, which are so mounted that there is a relatively gyratory motion between them. This motion is carefully controlled so as to regulate the wall thickness, this thickness being equal to the closest point of approach of the two die members to each other. In this way, one of the die members rolls the material against the other at a point on its periphery which moves progressively around the complete periphery during extrusion.

Further objects and advantages of the invention will appear more fully from the following description, particularly when taken in conjunction with the accompanying drawings which form a part thereof.

In the drawings:

Fig. 2 is a cross-section substantially along the line of 2—2 of Fig. 1.

Fig. 3 is a diagrammatical view of the means for producing the gyratory motion.

Fig. 4 is a detail cross-section through a portion of a modified form of the mechanism.

Figure 1:
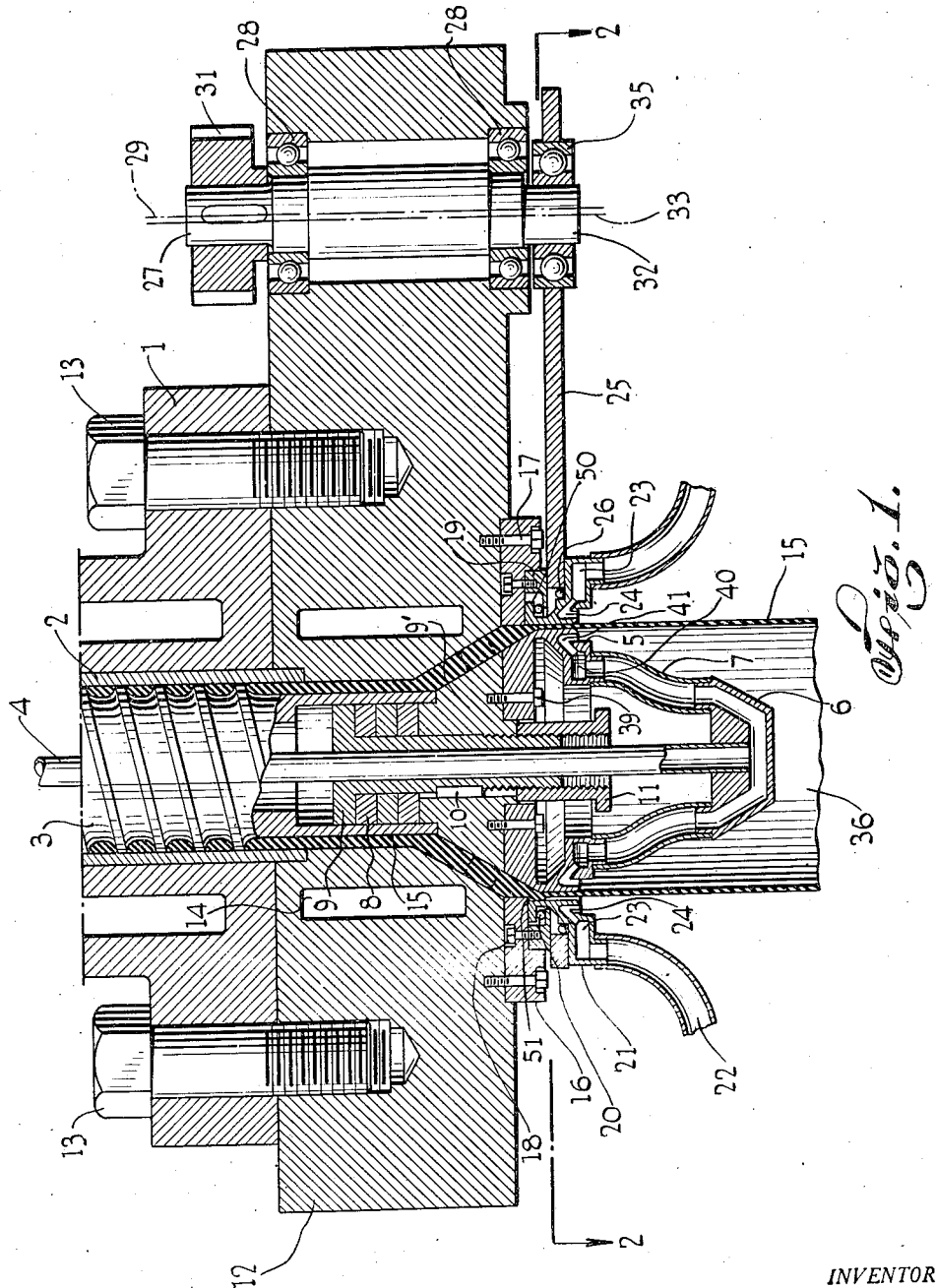
Fig. 1 shows in cross-section a sizing head for an extruding machine embodying my invention, looking approximately in the direction 1—1 of Fig. 2.

The device is intended to be applied to an extrusion machine having a main body, part of which is indicated at 1. Within the body is a cylinder formed by a liner 2. An extruding screw 3 is mounted to turn within the cylinder 2, and feeds a plastic material downward in Fig. 1. The screw 3 is hollow and is driven in any suitable manner, its speed being, however, regulated as will be explained below with respect to the gyratory motion of the moving die member.

Pipe 4 extending through the screw supplies cooling fluid through distributor 6 and flexible hoses 7 to the inner die member or mandrel 5. This mandrel has an external cylindrical shaping surface. This surface is cooled by fluid from flexible hoses 7, which flows through a distributing chamber 40 to outlets 41 which are open to the atmosphere. Packing rings 8 are held in position in the forward end portion 15 of screw 3 between a flange 8 and a block 9', to which is secured by screws 39 the mandrel 5. The piece carrying flange 9 is tightened by a nut 11, and is prevented from turning with respect to the block 9' by a key 10.

The head piece 12 is connected to the main body 1 by screws 13. It contains chambers 14 to which a fluid can be fed at a regulated temperature to control the temperature of the plastic material. Mounted on the outer face of head piece 12 by screws 17 is a ring 16 which surrounds an intermediate portion of the mandrel 5.

A ring 19 is inset into ring 16 and has a flange forming one of the tracks for balls 20. Ring 19 is preferably split and is held in position by screws 18. Within the ring 19 is mounted the second ring-shaped die member 21 which has an outwardly turned flange 50 engaging the balls 20 on the opposite side from the flange of ring 19. This member contains a ring-shaped distributing chamber 23 which is supplied with cooling fluid by flexible pipes 22. The fluid escapes from the chamber through openings 24 adjacent the surface of the extruded tube. Ring 21 has an internal cylindrical shaping surface opposite the external cylindrical surface of mandrel 5.

Ring 21 also has a surface engageable with balls 26 mounted within a circular opening in a two-armed operating member 25. The arms of this member are operated by shafts 27 mounted in bearings 28 in the head 12. The center lines of these shafts are indicated at 29. The shafts are driven at the same speed and in the same direction by a gear 30 engaging gears 31 on the two shafts and driven in any suitable fashion, but at a speed coordinated with the speed of the screw 3 in a manner to be described below.

Carried by the shafts 27 are eccentric projections 32, the centers of which are indicated at 33 and travel in circles indicated at 34 in Fig. 2. Bearings 35 are mounted on the extensions 32, and within openings in the member 25.

As a result of this construction, rotation of gear 30 will cause both the eccentrics 32 to turn in the same direction. It will be noted that the eccentrics are similarly oriented, that is, the lines joining centers 29 to centers 33 always extend in the same direction. The motion imparted to the lever 25 is thus one of pure gyration, in which the center 37 of ring 21 moves in a circle 38 around the center 36 of mandrel 5.

The difference in diameters of the mandrel 5 and ring 21 is greater than the thickness of the wall of the tube to be produced by an amount equal to the diameter of circles 34, 38, therefore, this difference is also greater than the diameter of circles 34, 38.

As a result of this construction, the tube is not merely expressed between two die members in fixed relation to one another. Instead, as the screw 3 turns and forces the plastic material out of the cylinder 2, ring 21 is gyrating constantly around the mandrel 5. The opposed cylindrical surfaces which give the final thickness to the tube of the ring and mandrel are of such length, and the speed of rotation of gear 39 with respect to screw 3 is such, that ring 21 makes at least one complete cycle of gyration during the period of time required for the plastic material to move the length of the opposed shaping surfaces. Thus as the material approaches these surfaces, it may spread out wider between them than the thickness of the finished tube wall 15, as shown for example at 51 of the left-hand side in Fig. 1. However, as the ring gyrates, it will eventually catch this material between itself and the mandrel at its point of closest proximity to the mandrel as shown at the right of Fig. 1. Thus the material is subjected to a lateral pressure and a peripheral rolling action during extrusion, which improves the quality of the plastic material and gives a finished wall of accurate thickness and substantially increased strength.

Fig. 4 shows in detail the die members with a modified form of cooling means, in which the cooling fluid is projected directly against the plastic material. The outer die member 21a contains an annular distributing chamber 43 which through passages 44 supplies fluid to a space 45 around the plastic material at a point before it reaches the shaping surface 52 and 53. This fluid escapes through grooves or slots 45', 45'' in the ring member 21.

Tubes 7 supply cooling fluid to an annular distributing chamber 46 in mandrel 5A. From chamber 46 the fluid passes through passages 47 to a space 48 within the plastic material at a point before it reaches the shaping surfaces. The fluid escapes from space 48 through passages 49 to the interior of the mandrel which is open to the atmosphere.

This mechanism operates in the same manner as that described in Fig. 1.

While I have described herein some embodiments of my invention, I wish it to be understood that I do not intend to limit myself thereby except within the scope of the appended claims.

I claim:

1. A machine for extruding tubes of plastic material comprising a mandrel having an external cylindrical surface, a die member having an internal cylindrical surface of greater diameter than said external surface, a pair of parallel shafts, means to drive said shafts at the same speed and in the same direction during extrusion of material between said surfaces, eccentrics carried by said shafts and similarly oriented with respect thereto, and means mounting said die member on said eccentrics around the mandrel, the eccentricity of said eccentrics being less than the difference between the radii of such surfaces, whereby when said shafts are driven said die member gyrates around the mandrel to knead and roll the material being extruded.

2. A machine for extruding tubes of plastic material comprising a mandrel having an external cylindrical surface, a die member having an internal cylindrical surface of greater diameter than said external surface, a pair of parallel shafts, means to drive said shafts at the same speed and in the same direction substantially continuously during extrusion of material between said surfaces, eccentrics carried by said shafts and similarly oriented with respect thereto, means mounting said die member on said eccentrics around the mandrel whereby when said shafts are driven said die member has a gyratory movement about the mandrel, and means to feed plastic material between such surfaces, said last means operating at such speed as to push material between said surfaces a distance less than the length of the opposed surfaces during one cycle of such gyratory movement so that a kneading and rolling action is exerted on said plastic material as it is extruded.

3. A machine for extruding tubes of plastic material comprising a body, a cylinder in said body having a screw therein for forcing plastic material therethrough, a mandrel concentric with said screw and having an external cylindrical molding surface, a head piece mounted on said body having an annular bearing surface a pair of shafts mounted in said head about axes parallel to the axes of the screw and mandrel and equidistant therefrom, means to drive said shafts in the same direction and at the same speed, eccentrics of equal eccentricity carried by the shafts, said eccentrics being similarly oriented with respect to the shafts, a two-armed lever mounted on said eccentrics, a ring having an internal molding cylindrical surface of a radius greater than the radius of the external molding surface by an amount greater than the eccentricity of said eccentrics, means rotatably mounting said ring in said lever around said mandrel, said ring having an annular bearing surface opposite said first bearing surface, and balls between said bearing surfaces, whereby when said shafts are driven said ring performs a gyratory movement about said mandrel, said screw operating at such speed as to push material between said molding surfaces a distance less than the length of the opposed molding surfaces during one cycle of such gyratory movement.

GIUSEPPE COZZO.

REFERENCES CITED

The following references are of record in the file of this patent:

UNITED STATES PATENTS

| Number | Name | Date |
| --- | --- | --- |
| 579,938 | Cushman | Mar. 30, 1897 |
| 1,845,249 | Derby | Feb. 16, 1932 |
| 1,914,689 | Humphrey | June 20, 1933 |
| 1,993,349 | Parkhurst | Mar. 5, 1935 |
| 2,131,173 | Greenall | Sept. 27, 1938 |
| 2,291,238 | Kimmick | July 28, 1942 |